United States Patent [19]
Berry, III et al.

[11] Patent Number: 6,089,790
[45] Date of Patent: *Jul. 18, 2000

[54] SELF-CLEANING INTAKE SCREEN

[76] Inventors: Russell M. Berry, III, 3086 Armstrong Ave., Clovis, Calif. 93611; Frances E. Borcalli, 118 Copper Leaf Way, Sacramento, Calif. 95838

[ * ] Notice: This patent is subject to a terminal disclaimer.

[21] Appl. No.: 09/047,236

[22] Filed: Mar. 25, 1998

Related U.S. Application Data

[63] Continuation-in-part of application No. 08/745,077, Nov. 7, 1996, Pat. No. 5,851,087.

[51] Int. Cl.$^7$ .................. B01D 33/044; B01D 33/056; B01D 33/06; B01D 33/073; B01D 35/02
[52] U.S. Cl. .................. 405/127; 138/41; 210/155; 210/157; 210/158; 210/161; 405/40; 405/42
[58] Field of Search ................ 405/42, 127, 39, 405/40; 210/154–158, 161; 138/40, 41

[56] References Cited

U.S. PATENT DOCUMENTS

| | | | |
|---|---|---|---|
| 578,179 | 3/1897 | Wolford | 210/415 |
| 628,517 | 7/1899 | Bliss et al. | 210/415 |
| 969,364 | 9/1910 | Grootenhuis | 210/354 |
| 1,051,757 | 1/1913 | Powers | 405/42 |
| 1,123,888 | 1/1915 | Kempf | 405/42 |
| 1,210,759 | 1/1917 | Breddin | 210/156 |
| 1,348,945 | 8/1920 | Hirshstein | 210/166 |
| 2,013,971 | 9/1935 | Raisch | 210/107 |
| 2,022,336 | 11/1935 | Bower | 210/157 |
| 2,136,853 | 11/1938 | Knecht | 210/397 |
| 4,017,394 | 4/1977 | Hensley | 210/157 |
| 4,874,017 | 10/1989 | Hendrickson | 138/41 X |
| 5,032,264 | 7/1991 | Geiger | 405/127 X |
| 5,102,537 | 4/1992 | Jones | 210/162 |

OTHER PUBLICATIONS

Custom Technology Co., Inc., specification sheet for Self Cleaning Suction Screen, 2 pages.
Claude Laval Corp., product description brochure for Self–Cleaning Pump Intake Screens, 4 pages, revised Apr., 1991.
Declaration of Russell M. Berry, dated Jun. 24, 1998 with figure.

*Primary Examiner*—Eileen Dunn Lillis
*Assistant Examiner*—Tara L. Mayo
*Attorney, Agent, or Firm*—Limbach & Limbach L.L.P.

[57] ABSTRACT

A self-cleaning intake screen assembly for preventing debris, fish, and other wildlife from being transferred from a waterway such as a lake or river, which includes a conical support structure, a screen and a screen sweeping assembly. The conical support structure has a circular base, a cap plate, and a plurality of support studs extending therebetween. The screen extends between the base and the cap plate and is affixed to the support studs. The screen sweeping assembly is rotatably mounted to the cap plate for sweeping debris off of the screen. A flow restrictor is disposed inside the conical support structure for restricting water flow through a portion of the screen in order to reduce differences in water flow rates through different portions of the screen.

9 Claims, 12 Drawing Sheets

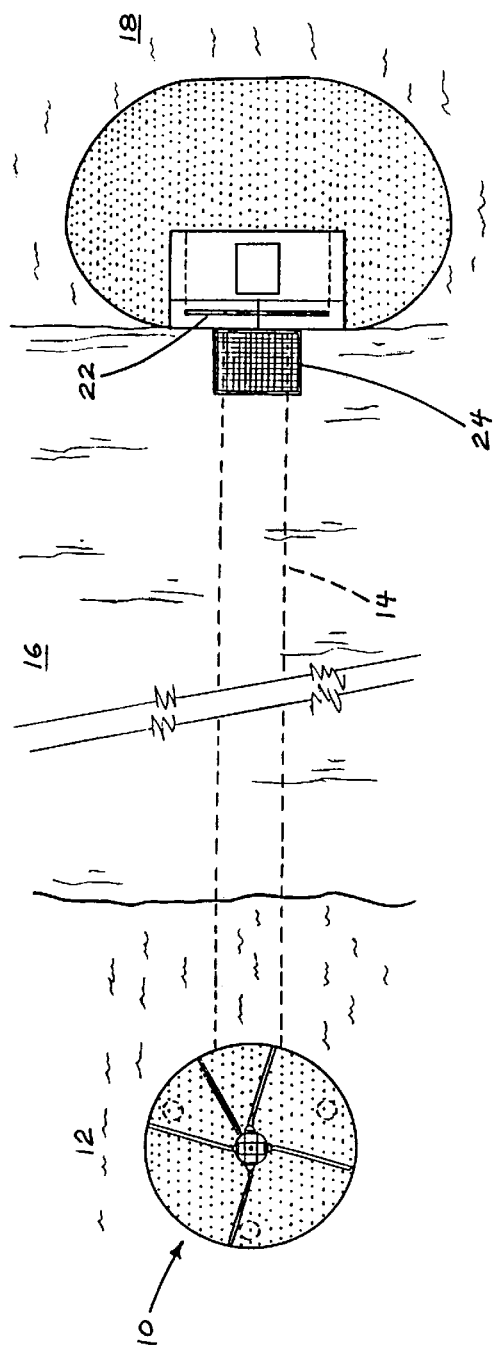
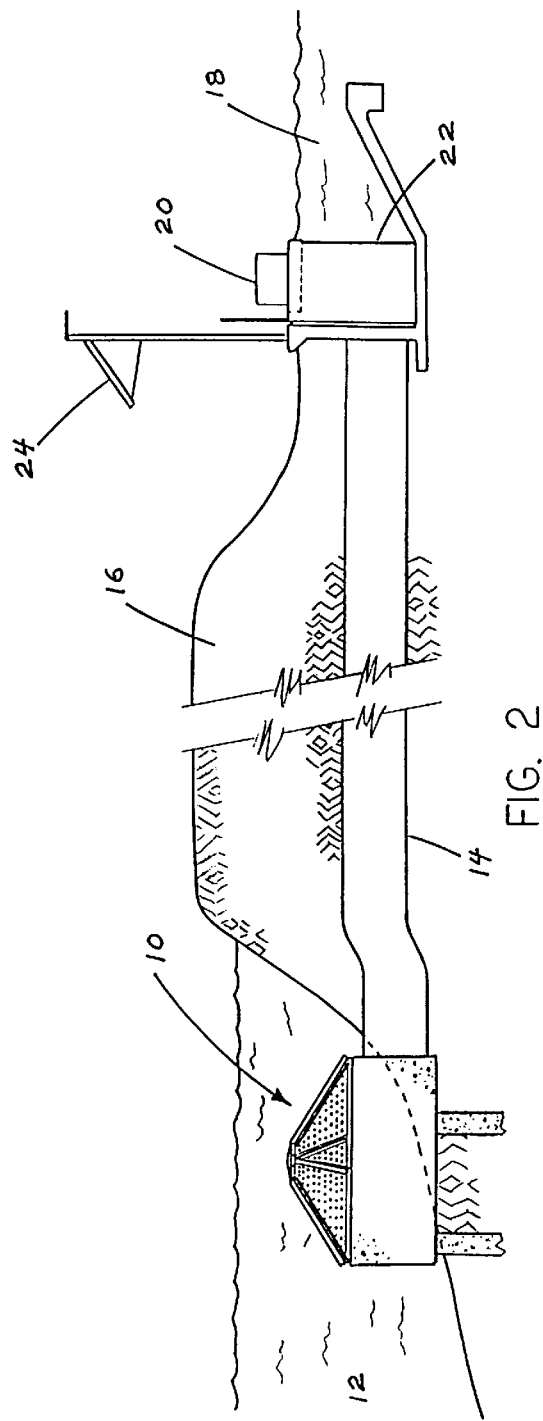

SELF-CLEANING INTAKE SCREEN

This is a continuation-in-part of Application No. 08/745,077, filed Nov. 7, 1996, now U.S. Pat. No. 5,851,087.

FIELD OF THE INVENTION

This invention relates to intake screens to exclude fish and debris from entering a water inlet, and is particularly directed to a self-cleaning intake screen.

BACKGROUND OF THE INVENTION

Self-cleaning intake screens are well known in the art. The earliest of such devices simply employed some mechanism to cause the screen, generally cylindrical in shape, to rotate within the stream or waterway. As the screen rotated, any debris trapped on its upstream side would be washed away as it turned downstream. More sophisticated devices employ some sort of backwash system which, either continually or at periodic intervals, spray a high pressure jet of water or air against the inside of the screen in an attempt to blow debris off of and away from the screen. However, most self-cleaning intake screen designs are complicated and/or do not effectively keep the screen free from debris.

Further, for many applications of intake screens, there is a maximum flow rate per unit area of screen that cannot be exceeded in order to protect fish and other wild life that are in the water passing through the intake screen. Simply making the screen larger to reduce the per unit area flow rate is ineffective since the water tends to flow through the central portion of the screen.

There is a need for an intake screen that reliably and effectively cleans itself, as well as minimizes the maximum water flow rate passing through the screen.

SUMMARY OF THE INVENTION

The present invention solves the aforementioned problems by providing an intakes screen assembly that efficiently and effectively cleans itself, while also minimizing the difference in flow rates through different portions of the screen.

In one aspect of the present invention, a self-cleaning intake screen assembly for preventing debris, fish, and other wildlife from being transferred from a waterway such as a lake or river, includes a conical support structure, a screen and a screen sweeping assembly. The conical support structure has a circular base, a cap plate, and a plurality of support studs extending therebetween. The screen extends between the base and the cap plate and is affixed to the support studs. The screen sweeping assembly is rotatably mounted to the cap plate for sweeping debris off of the screen.

In another aspect of the present invention, a flow restrictor is disposed inside the conical support structure for restricting water flow through a portion of the screen in order to reduce differences in water flow rates through different portions of the screen.

Other objects and features of the present invention will become apparent by a review of the specification, claims and appended figures.

BRIEF DESCRIPTION OF THE DRAWINGS

FIG. 1 is a top plan view of the invention in place in a waterway and providing filtered water through a levee to a commercial utility or agricultural canal;

FIG. 2 is a side view in partial section of that shown in FIG. 1;

DETAILED DESCRIPTION OF THE PREFERRED EMBODIMENTS

Figure 3:
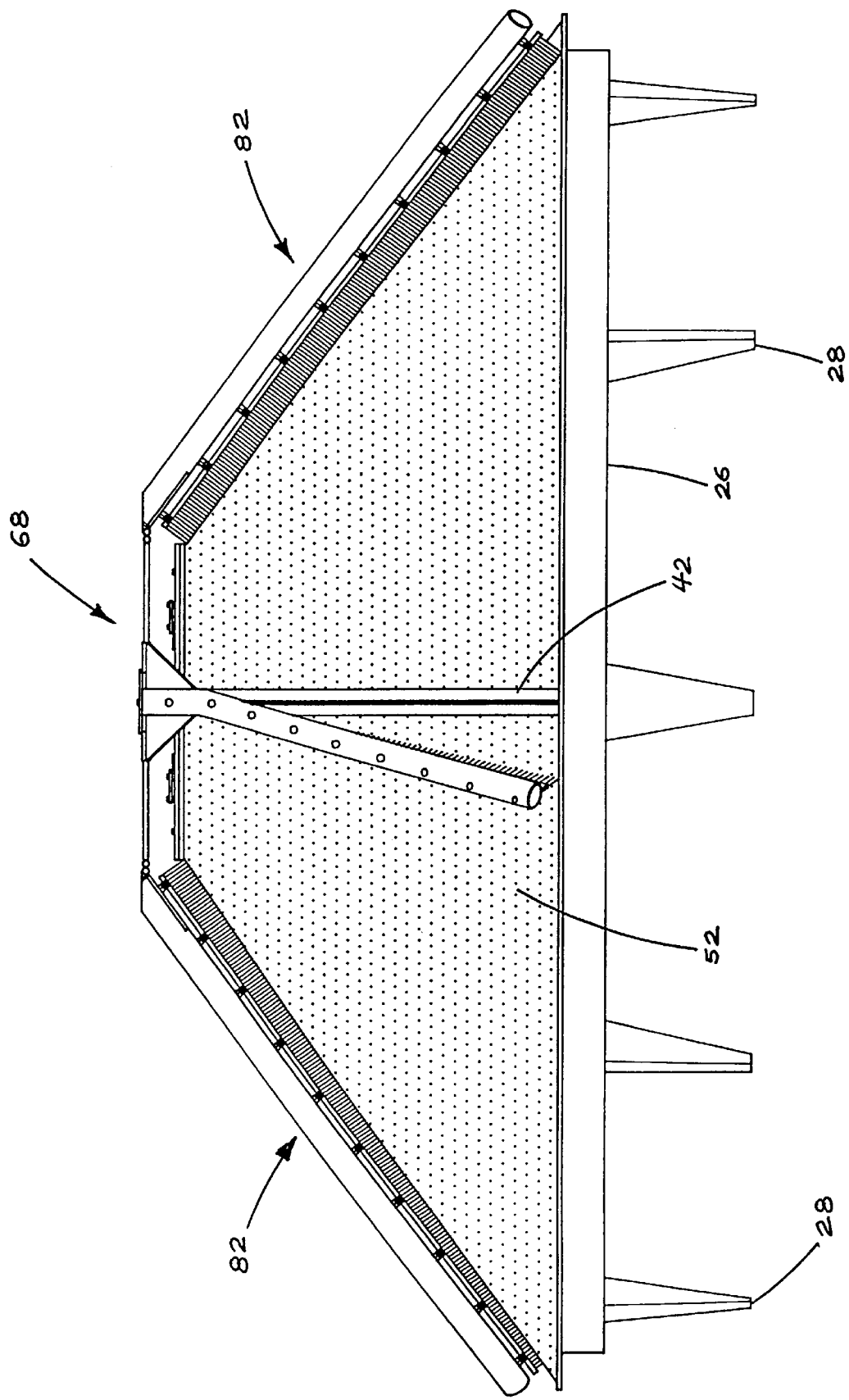
FIG. 3 is a side elevational view of the invention.

Referring now to the drawings, wherein like reference numerals designate identical or corresponding parts throughout the several views, FIG. 1 and FIG. 2 show the self-cleaning intake screen assembly of the present invention depicted generally at 10 where it is submerged within a waterway 12 to provide filtered water through a pipe 14 which runs through a levee 16 to a canal 18 or pipe for further distribution. The water level in the canal is monitored by a controller 20 which raises and lowers a gate 22 to adjust the water flow. Such devices are often powered by a solar panel 24 for operation in remote areas.

Figure 4:
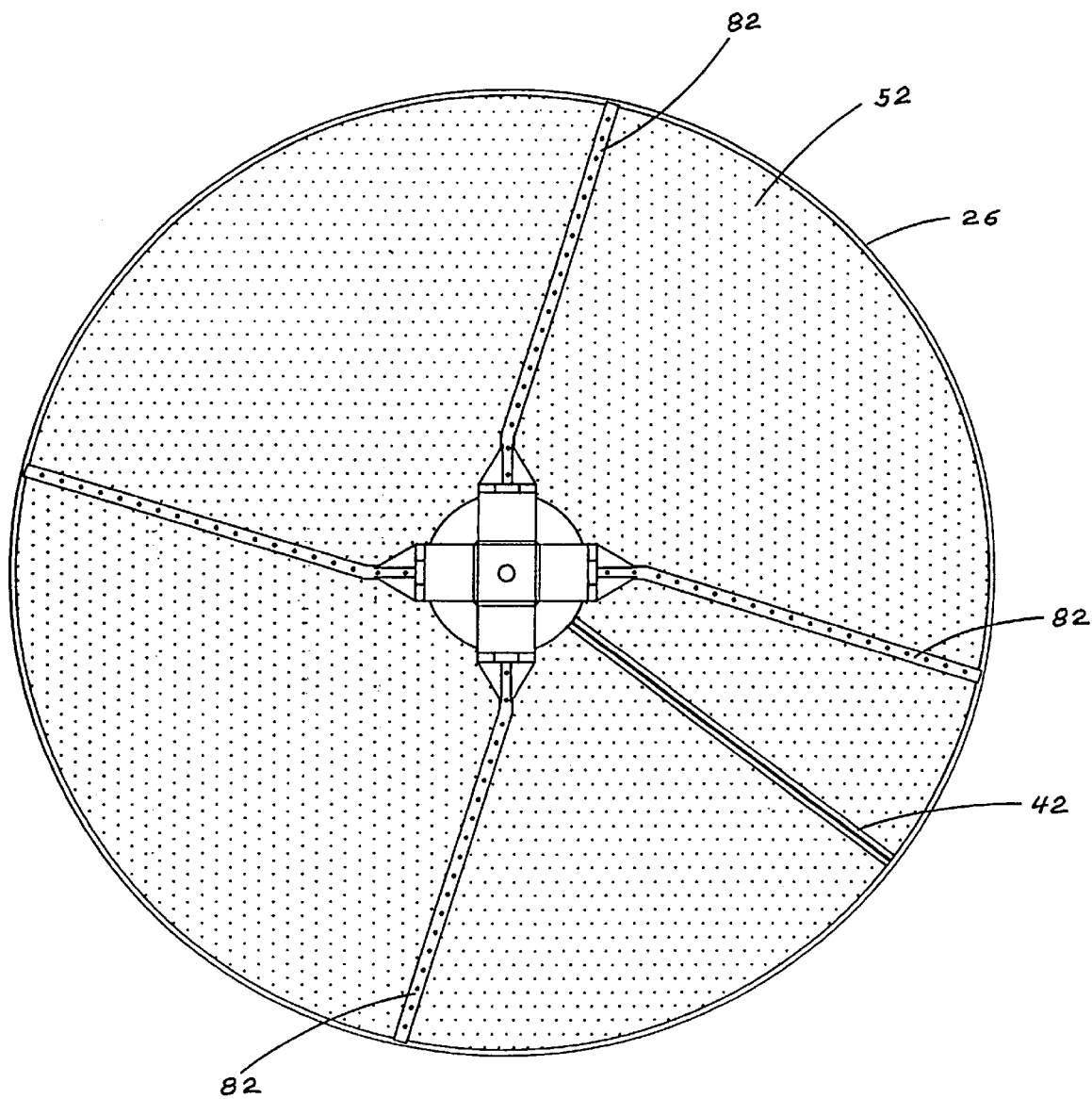
FIG. 4 is a top plan view of the invention.
Figure 5:
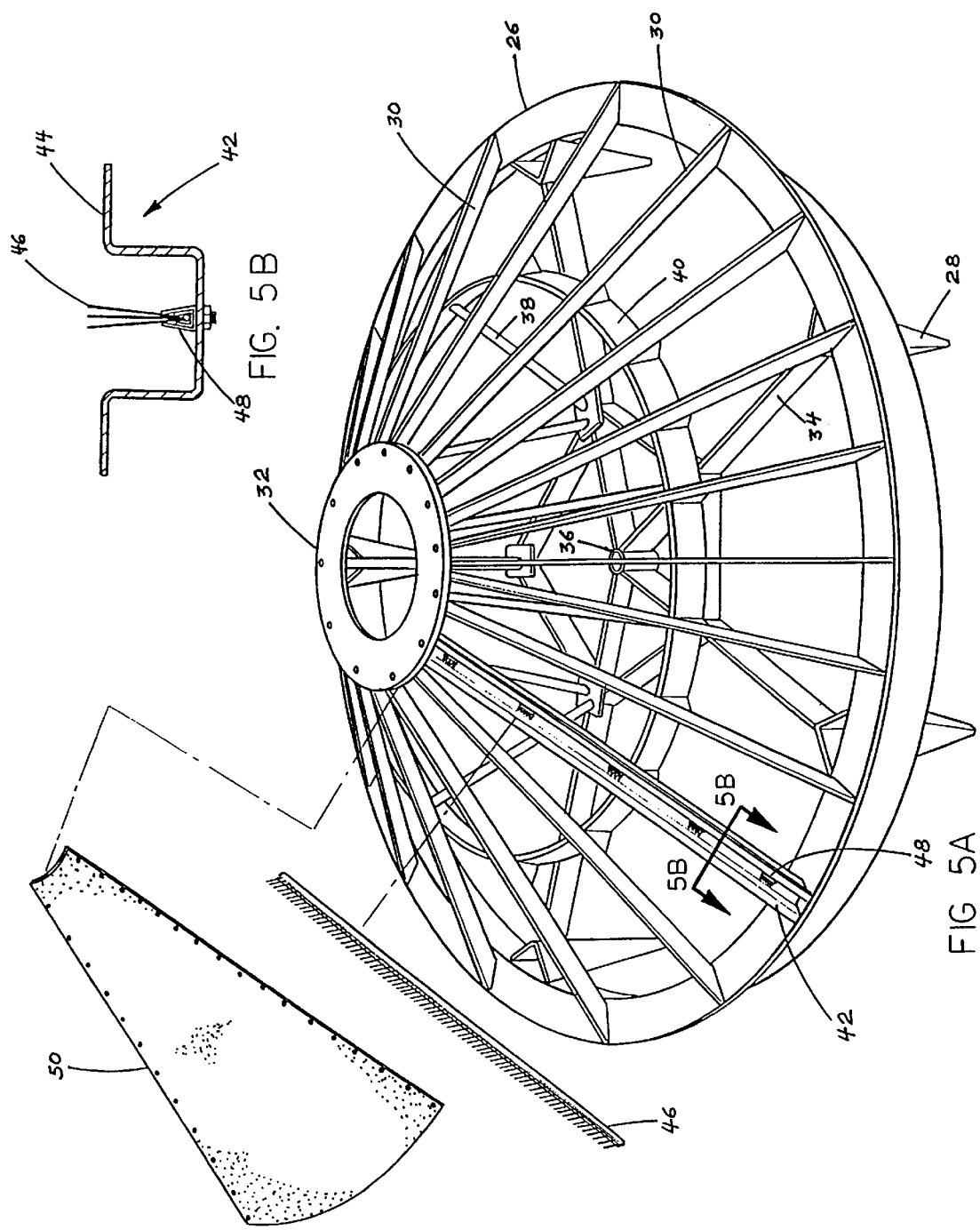
FIG. 5A is a perspective view of the conical support structure of the invention, one screen section, and the brush cleaner.
FIG. 5B is a sectional view of the brush cleaner taken along line 5B—5B of FIG. 5A.

Referring now primarily to FIGS. 3, 4, and 5A, the self-cleaning intake screen assembly 10 is preferably fabricated from stainless steel and is seen to comprise a circular, inverted L-shaped base 26 with a series of legs 28 welded to its interior surface and extending downward and inwardly therefrom. Welded to and extending upward and inward at a 35 degree angle from the circular base 26 is a series of spaced studs 30 which are welded to and support a circular cap plate 32. For additional support, the circular base 26 has a series of five spokes 34 extending from a central hub 36 and welded to the interior of the circular base 26. These spokes 34 support a series of upwardly angled tubes 38, which in turn support a stud support ring 40, welded to the lower side of the studs 30, and the cap plate 32. Also extending between the circular base 26 and the cap plate 32 is a brush cleaner 42. Referring also to FIG. 5B, the brush cleaner 42 is seen to comprise an elongate, U-shaped member 44 with an elongate cleaning brush 46 secured therein and extending upward therefrom. The cleaning brush 46 is secured within the U-shaped member 44 by means of a plurality of brush holders 48. The brush holders 48 are familiar to those in the art and are simply clamps which are bolted within the U-shaped member 44 and then closed over the channel of the brush 46.

Secured to the outer edges of the studs 30, preferably by riveting, is a plurality of perforated plate sections 50 which extend between the cap plate 32 and the circular base 26 to form a conical intake screen 52 as depicted in FIGS. 3 and 4. The perforated plate preferably has a hole diameter of from 3/32inch to 1/4inch. Also depicted in FIGS. 3 and 4 is the brush cleaner 42, with the bristles of the cleaning brush 46 extending approximately 1/4inch above the surface of the intake screen 52 through a gap left between adjacent perforated plate sections 50 which are riveted to the edges of the U-shaped member 44. The cleaning brush 46, the function of which will be described below, preferably has 0.060 inch diameter nylon bristles.

Figure 6:
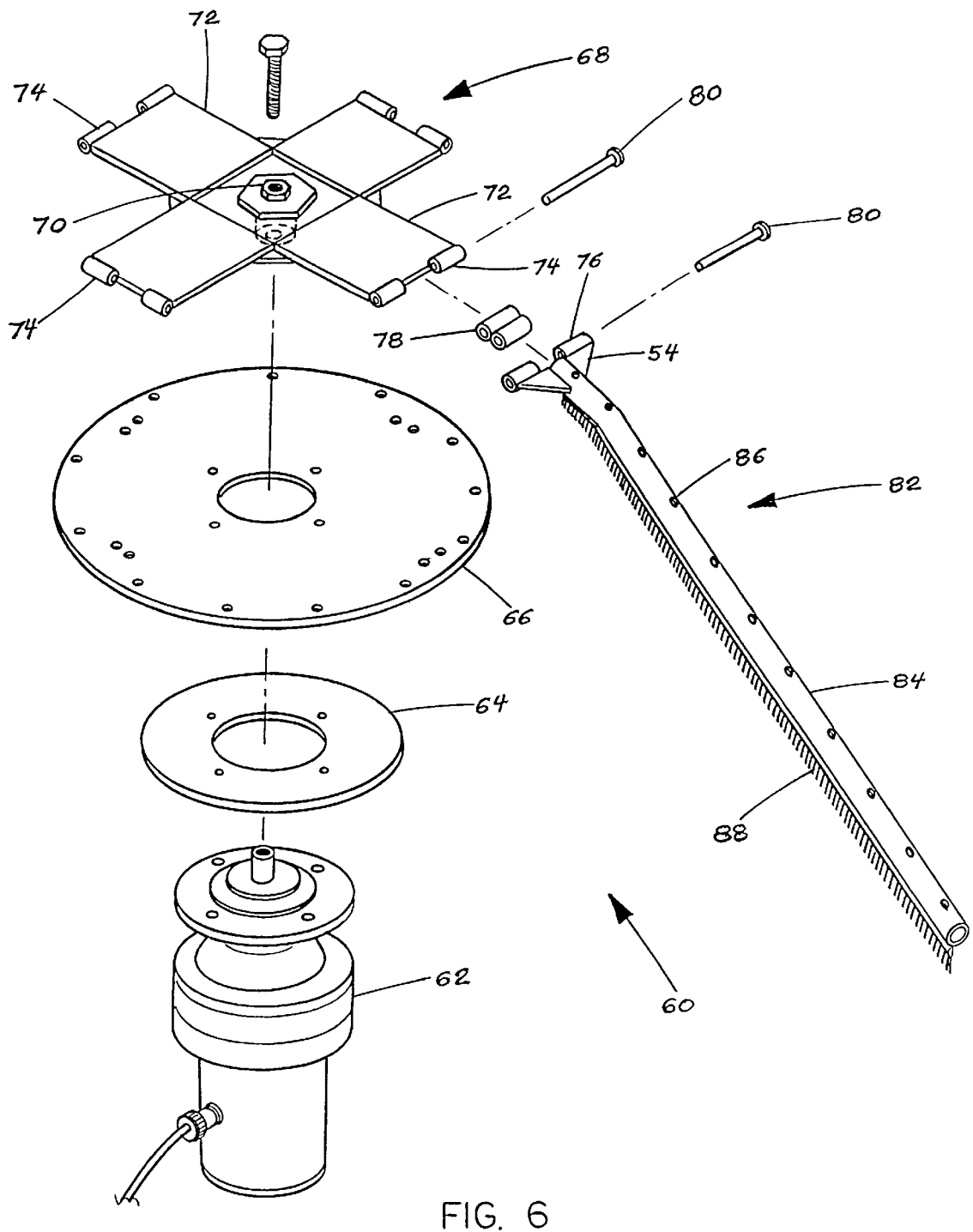
FIG. 6 is an exploded view of the screen sweeping assembly of the invention.
Figure 7:
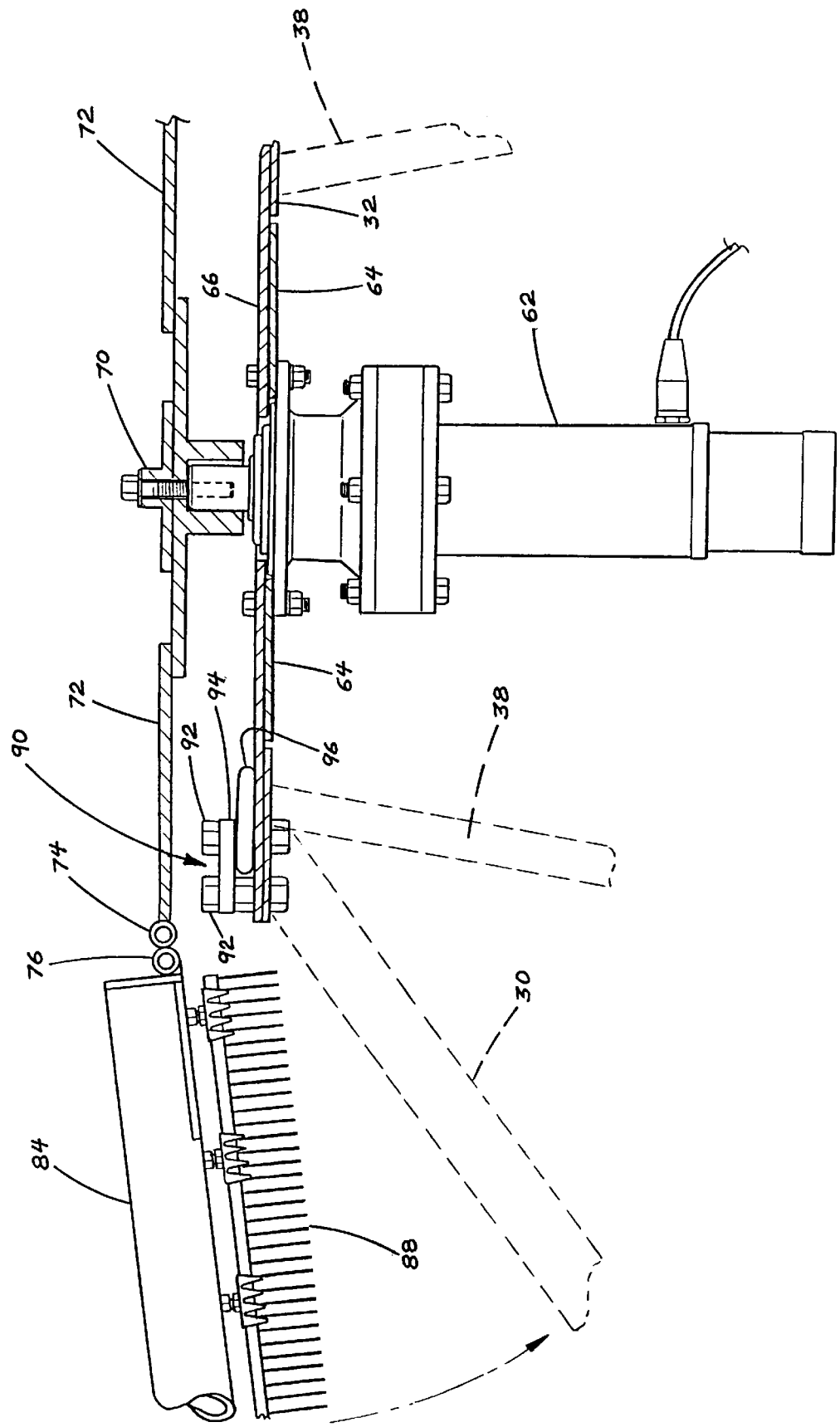
FIG. 7 is a side view, in partial section, of the drive mechanism and screen sweepers of the invention.

Referring now primarily to FIGS. 6 and 7, the screen sweeping assembly 60 is seen to include a motor 62, a reinforcement plate 64, and a motor plate 66, the three of which are attached together by bolts (not shown) and then secured to the cap plate 32 (FIGS. 5A) by bolts (also not shown). The preferred motor 62 is a submersible, high torque, low speed gear reduction motor with programmable operating modes available from Empire Magnetics, Inc. The sweeping assembly 60 also includes a sweeper hub 68 having a central motor attachment hub 70 with four extensions 72, each having a pair of hinge knuckles 74 for cooperation with a complimentary pair of hinge knuckles 76 affixed by gussets 54 to the inner end of the screen sweepers 82. The two pairs of hinge knuckles 74, 76 are connected by a double knuckle 78 and two hinge pins 80 to provide a double pin hinge for increased flexibility in the pivot joint.

Figure 10:
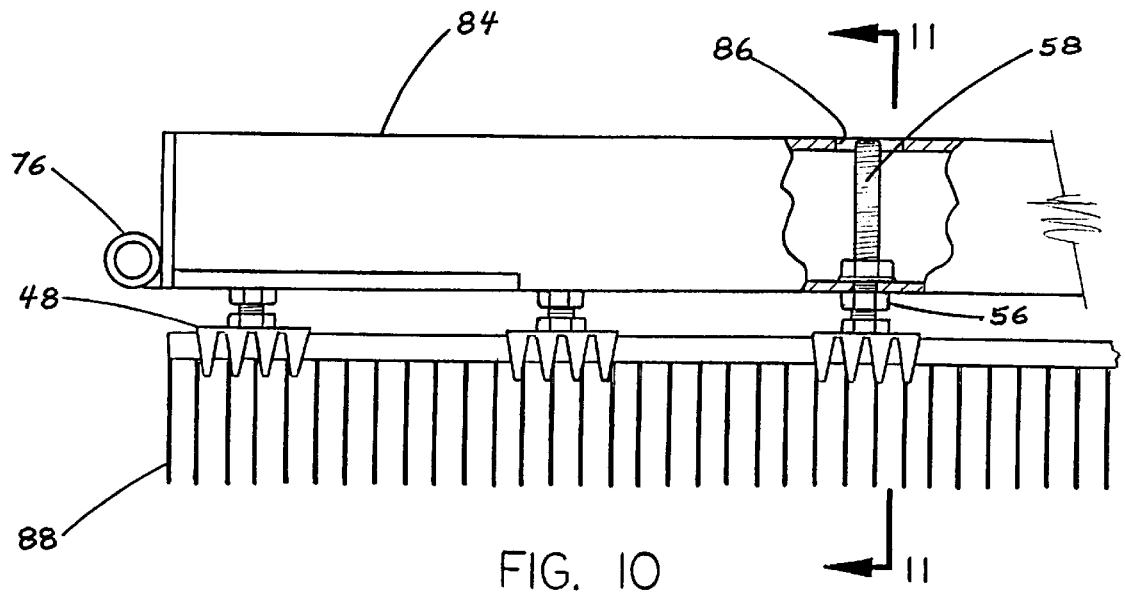
FIG. 10 is a side view, in partial section, of a screen sweeper.
Figure 11:
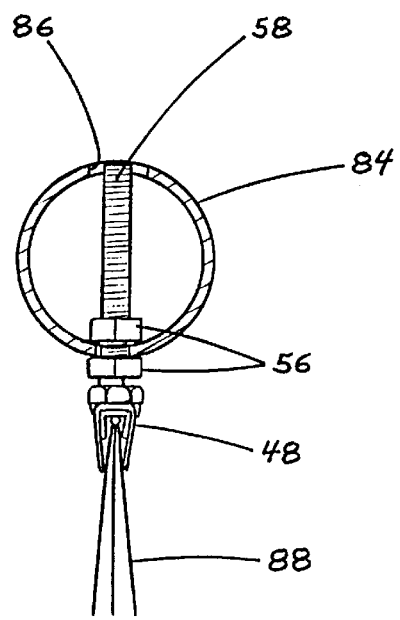
FIG. 11 is a sectional view of a screen sweeper taken along line 11–11 of FIG. 10.

Referring also to FIGS. 10 and 11, the screen sweepers 82 are comprised of an elongate tube 84 with an approximately 15 degree clockwise bend adjacent their inner end. The tube 84 has a series of brush-holder access holes 86 along its upper side to permit installation of a series of brush holders 48 within holes in the lower side of the tube 84. Each brush holder 48 has a stud 58 and is secured to the tube 84 by means of a pair of nuts 56. The brush holders 48 in turn are clamped to a sweeper brush 88 which then extends along the lower length of the brush holder 48 for contact with the conical intake screen 52. The sweeper brush 88 preferably has nylon bristles 0.045 inch in diameter.

Also shown in FIG. 7 is one of four lifting lugs 90 which are secured around the circumference of the motor plate 66 to permit the invention to be lifted by a crane for installation in a waterway. The lifting lugs 90 include a pair of bolts 92 having a cross-member 94 secured between them, and which are attached to the motor plate 66 and the cap plate 32. The cross-member 94 carries a lifting ring 96 which moves freely on the cross-member 94 for attachment to a crane hook.

Figure 8:
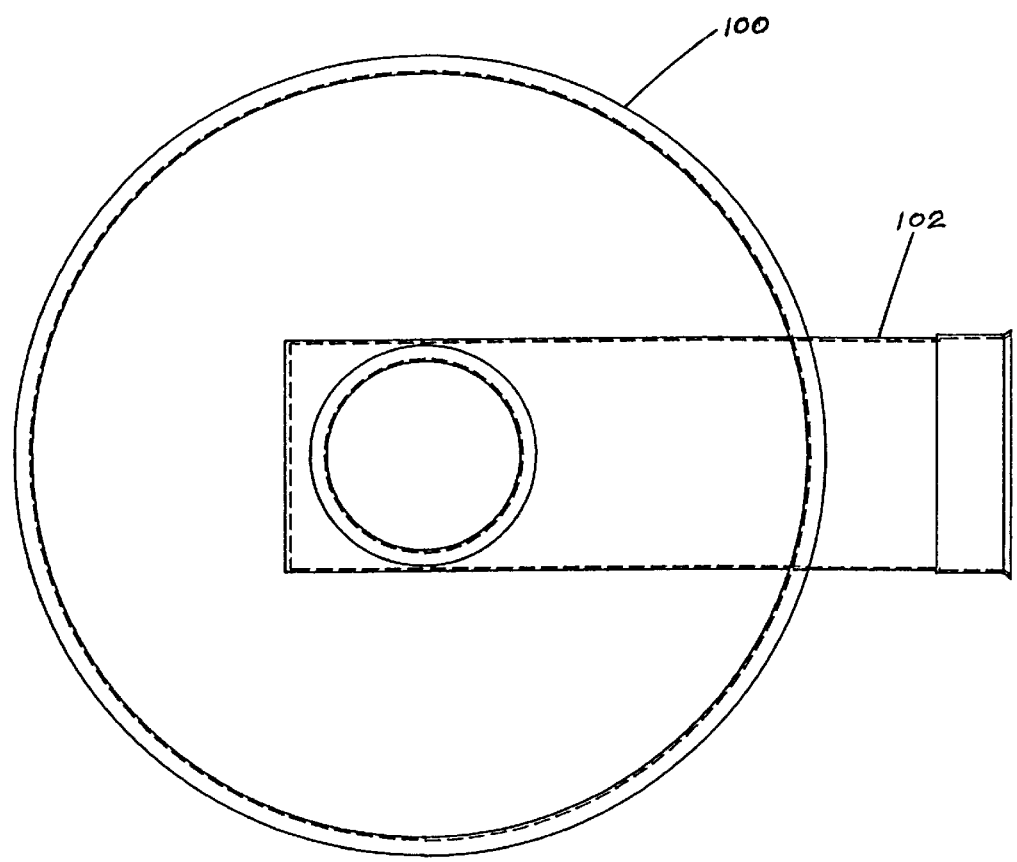
FIG. 8 is a top plan view of a base and outlet pipe for the invention.
Figure 9:
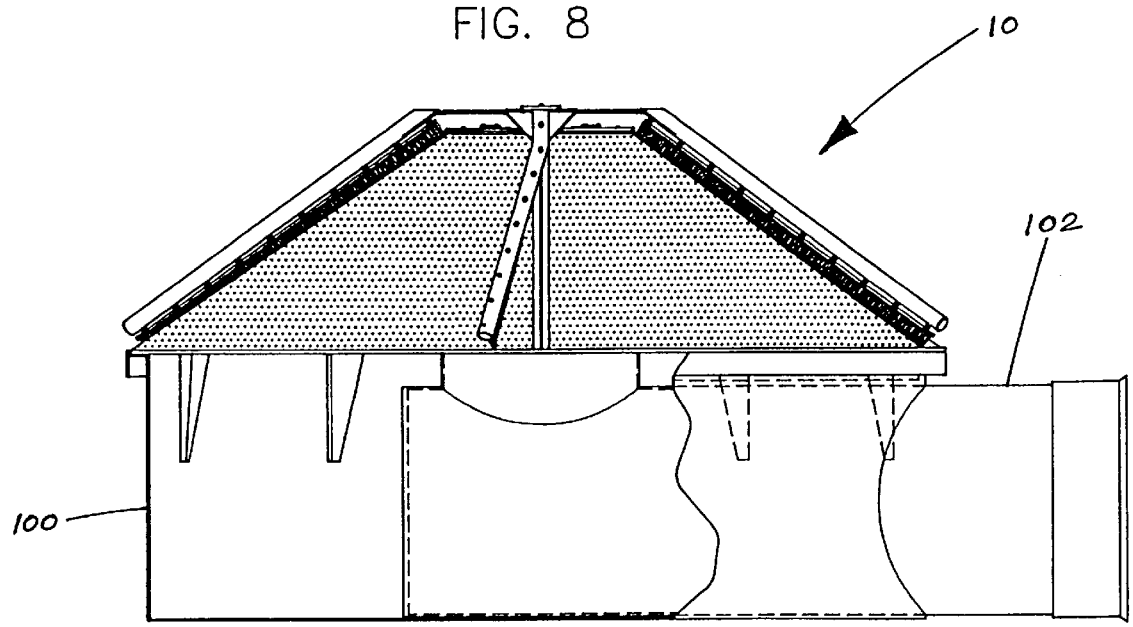
FIG. 9 is a side view, in partial section, showing the invention resting on the base of FIG. 8.

Referring now to FIGS. 8 and 9, a typical installation of a first embodiment of the self-cleaning intake screen assembly 10 is depicted in a circular fiberglass or concrete tank 100 having an intake pipe 102. As seen in FIG. 9, the self-cleaning intake screen assembly 10 is placed on top of the tank 100 with the circular base 26 resting on the upper edge of the tank for structural support, whereby only filtered water may enter the tank 100 and be carried away by intake pipe 102. The input end 104 of intake pipe 102 is positioned directly underneath central hub 36 to draw water in from the bottom center of the self-cleaning intake screen assembly 10.

Figure 12:
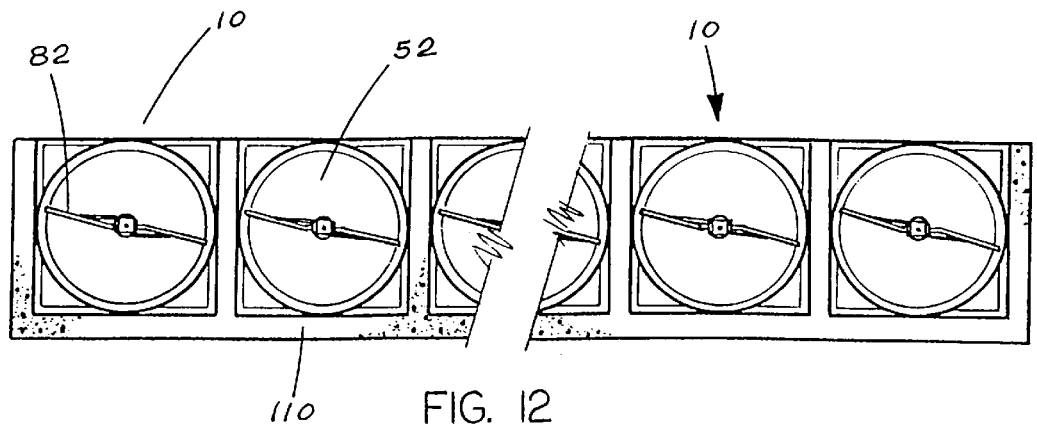
FIG. 12 depicts the installation of a series of second embodiments of the invention.
Figure 13:
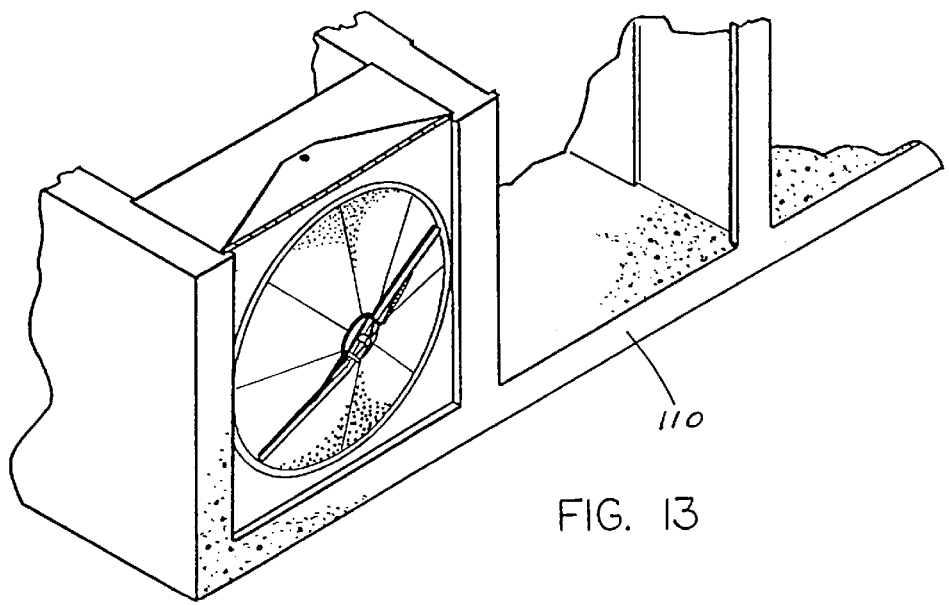
FIG. 13 is a perspective view of the second embodiment in place in a concrete embankment.
Figure 14:
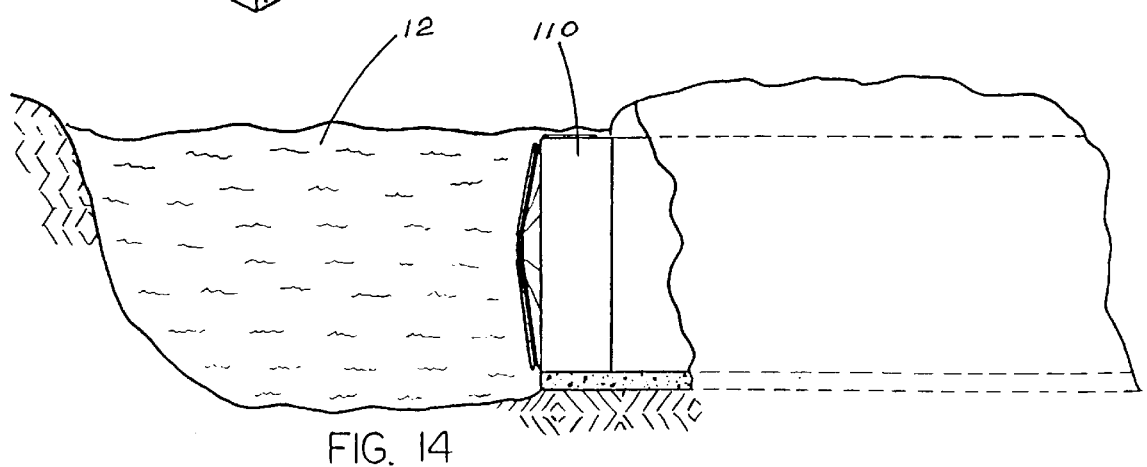
FIG. 14 is a side sectional view of the second embodiment in use.

A second embodiment of the invention is shown in FIGS. 12, 13, and 14. One or more of the self-cleaning intake screen assemblies 10 are placed in a concrete embankment 110 along a waterway 12 and filter the water as it passes horizontally through the intake screens and into a canal, pumping bay, or other water storage facility. The conical screens 52 of this embodiment utilize a much lower angle of approximately three degrees instead of the 35 degree slope of the first embodiment. The only other primary difference is that the screen sweepers 82 are spring loaded for engagement with the screen 52 and utilize a gauge wheel on the outer end of the screen sweeper to prevent flattening or excessive bending of the brush bristles.

It has been discovered that when the input end 104 of intake pipe 102 is centrally disposed underneath the self-cleaning intake screen 10, and the screen diameter is significantly larger than the diameter of the input end 104 of intake pipe 102, there is an uneven rate of water flow through the conical intake screen 52. Specifically, water flow through the upper portion 106 of screen 52 near cap plate 32 can be significantly greater than water flow through the lower portion 108 of screen 52 near the base 26. Uneven flow is a problem for applications where the water flow rate at any point along screen 52 cannot exceed a predetermined limit, for example to protect fish or other wildlife present in the waterway, levee or canal. The large flow rate through the upper portion of screen 52 near the cap plate may place an undesirably low limit on how much water can flow through the self-cleaning intake screen assembly 10.

Figure 15:
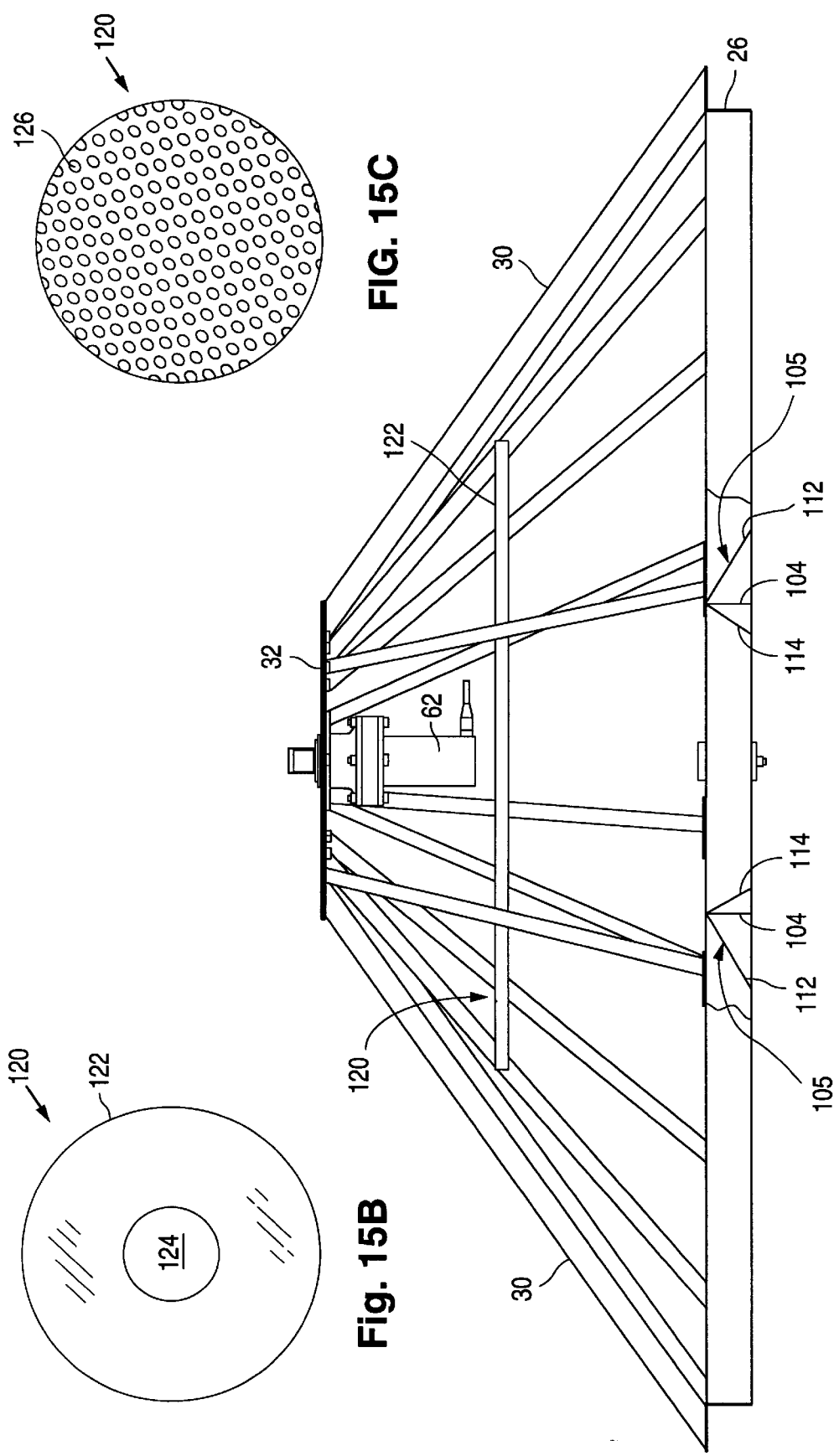
FIG. 15A is a partial fragmentary side view of the invention including a flow restrictor.
FIG. 15B is a top view of the flow restrictor of FIG. 15A with a center hole.
FIG. 15C is a top view of the flow restrictor of FIG. 15A with perforated holes.

To minimize water flow rate variations along screen 52, a flow restrictor 120 is placed inside the self-cleaning intake screen assembly 10. Flow restrictor 120 restricts the amount of water flowing down through the central portion of the self-cleaning intake screen assembly 10, which corresponds to the water flowing through the upper portion 106 of screen 52 near the cap plate 32. FIGS. 15A–C, 16 and 17 illustrate three different examples of restrictor 120. In FIGS. 15A–C, restrictor 120 is a disk shaped member 122 centrally disposed inside self-cleaning intake screen assembly 10 and above input end 104 of intake pipe 102. Disk member 122 can be solid, or have a central hole 124 to allow some water flow therethrough (FIG. 15B), and/or be perforated with many small holes 126 (FIG. 15C). The size and number of holes 124/126, along with the diameter of disk member 122 and how far above inlet end 104 it is disposed, is selected to provide the desired flow rate through upper portion 106 of screen 52 in order to minimize the difference in flow rates through the various portions of screen 52. The position of the disk 122 may be made to be adjustable, so the operator can change the distance between disk 122 and the intake pipe 102 during operation in order to fine tune and even out the water flow rates through different portions of screen 52.

It has also been discovered that significant turbulence may exist in water near the inlet end 104. The turbulence is caused by water that flows horizontally near base 26 and passes over the edge of input end 104. Therefore, an annular flow fender 105 is formed around the circumference of input end 104 of intake pipe 102 to minimize such turbulence, as best illustrated in FIG. 15A. The flow fender 105 includes sloping portions 112 and 114 so that horizontally flowing water near input end 104 is not suddenly redirected vertically.

Figure 16:
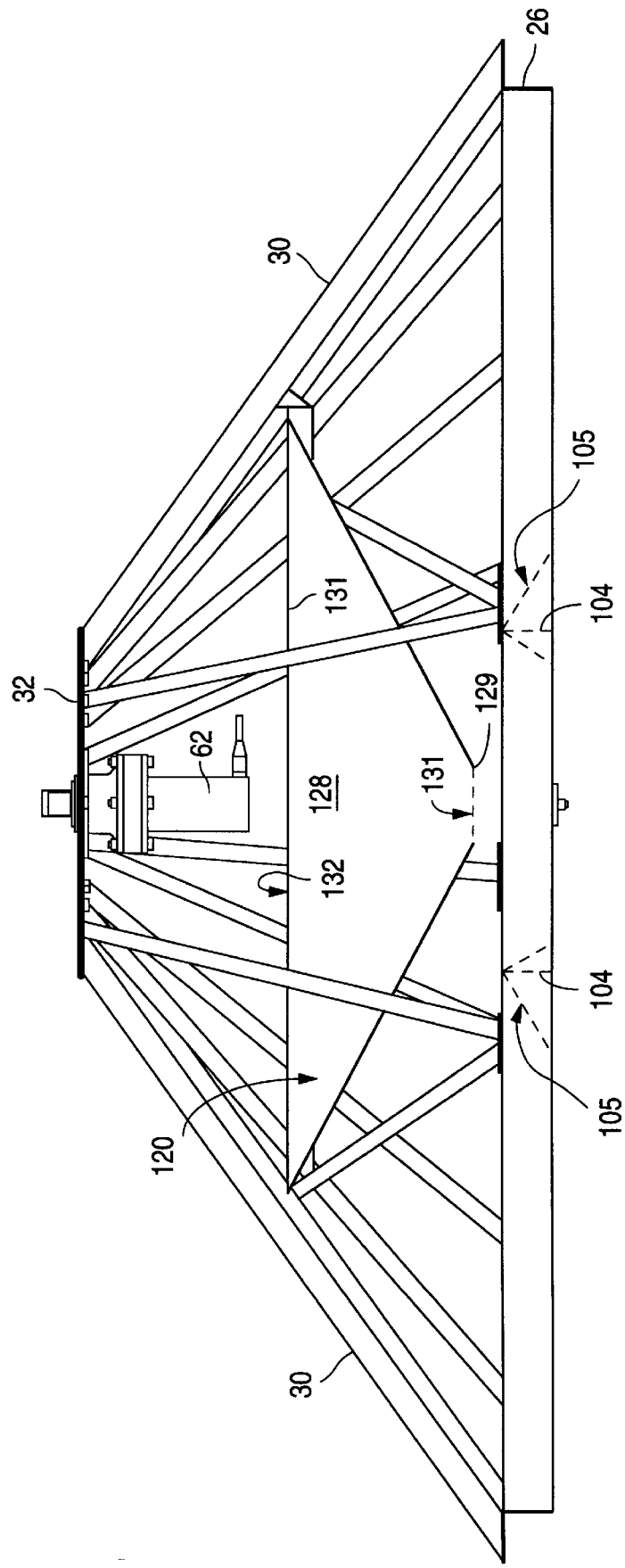
FIG. 16 is a side view of the invention including an alternate embodiment of the flow restrictor.
Figure 17C:
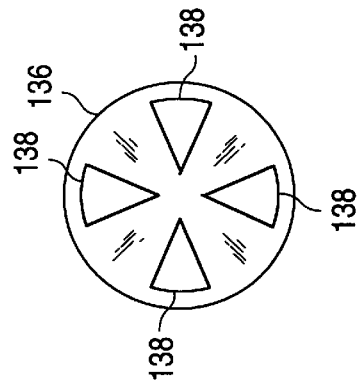
FIG. 17C is a top view of the second cone member of the second alternate embodiment of the flow restrictor.
Figure 17B:
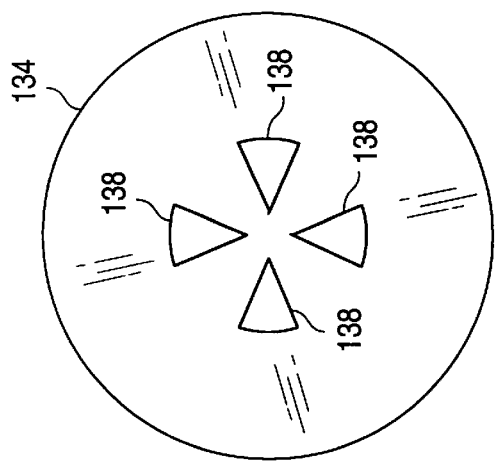
FIG. 17B is a top view of the first cone member of the second alternate embodiment of the flow restrictor.
Figure 17A:
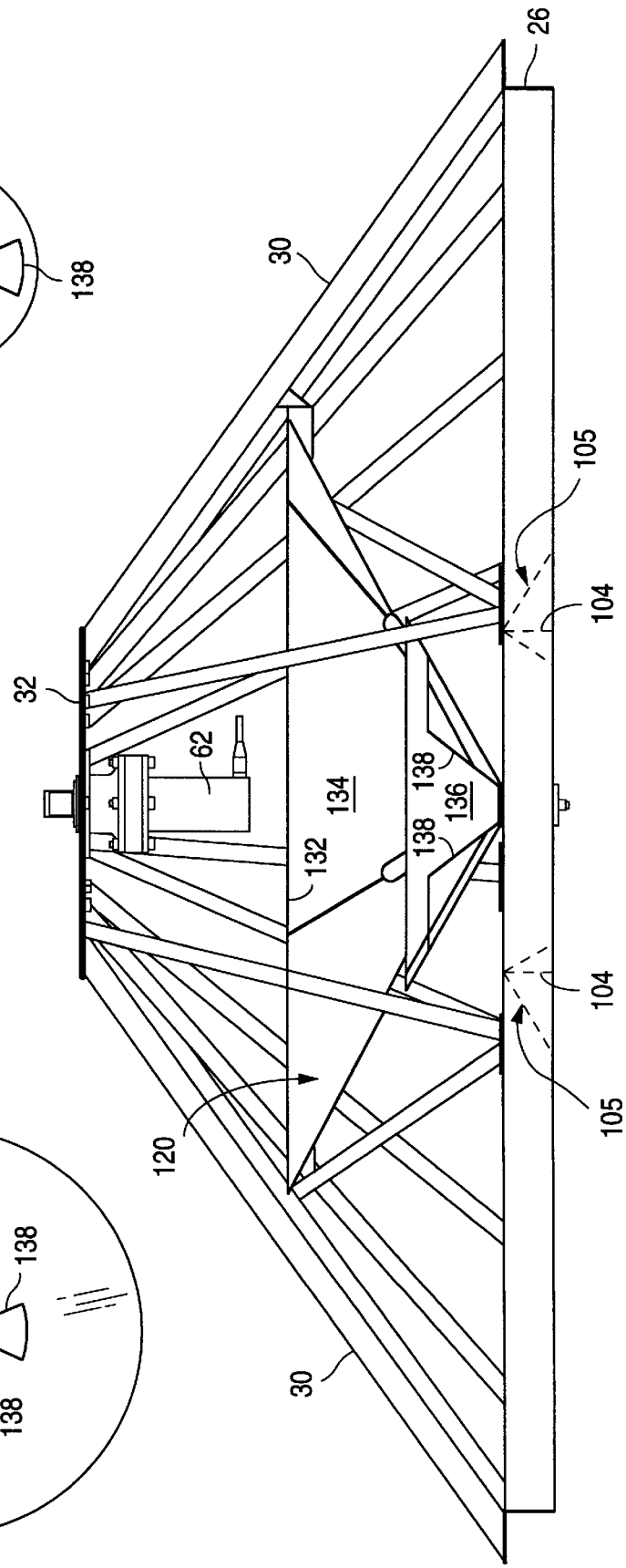
FIG. 17A is a side view of the invention including a second alternate embodiment of the flow restrictor.

FIG. 16 illustrates an alternate embodiment of flow restrictor 120, which is formed by an inverted conical member 128 centrally disposed inside self-cleaning intake screen assembly 10. The apex end 129 of conical member 128 terminates in an opening 130, which is positioned above input end 104 of intake pipe 102, and the base end 131 of conical member 128 terminates in an opening 132 that faces the cap plate 32. Opening 132 collects water flowing through the upper portion of screen 52 near cap plate 32. The height and position of conical member 128, and the diameters of openings 130/132 dictate the restriction in the water flow from the upper portion of screen 52 near cap plate 32. The position of the conical member 128 may be made to be adjustable, so the operator can change the distance between conical member 128 and the intake pipe 102 in order to fine tune and even out the water flow rates through different portions of screen 52. FIGS. 17A–C illustrate a third alternate embodiment of flow restrictor 120, which is formed by two inverted and overlapping cone members 134 and 136, each having wedge shaped holes 138 near their respective apexes. The apex of cone member 136 is positioned directly above input end 104 of intake pipe 102, and the large opening 132 of cone member 134 faces the cap plate 32 for collecting water flowing through the upper portion of screen 52. Cone member 136 is positioned over the apex of cone member 134, in a rotatable manner, so that the amount of overlap of the wedge shaped holes 138 of the cone member 134 and the wedge shaped holes 138 of cone member 136 can be selectively changed. By rotating cone member 136 relative to cone member 134, the amount of flow through cone members 134/136 can be adjusted to fine tune and even out the water flow rates through different portions of screen 52.

OPERATION

The motor of the invention will typically operate at one revolution per minute, in a programmable sequence of directions and times as necessary for the amount of debris encountered in the waterway. One exemplary program might involve three counterclockwise revolutions (the forward direction), followed by one clockwise revolution, every hour. Another program, for example, involves making three counterclockwise revolutions, one clockwise revolution, and then stop for a selectable interval of from 15 minutes to 3 hours, although continuous cleaning is also an option. As the screen sweepers moves across the screen, they gather debris that has collected on the screen surface, pushing some ahead of the brush bristles and breaking up some of the material, allowing it to pass through the screen. The device may further be solar powered so it can operate unattended for extended periods in remote areas.

The conical shape of the intake screen exploits the force of gravity to drive the debris down the sides of the cone when the invention is placed in the waterway with the axis of the conical screen oriented vertically. Further, the fact that the screen sweepers are angled rearwardly of the sweeping direction tends to work the debris down the sides of the cone and off the lower edge of the screen. When the screen sweeper encounters the brush cleaner, the smaller diameter bristles of the sweeper brush pass through the bristles of the cleaning brush, allowing debris and algae to be raked out of the sweeper brush and carried away by flowing water.

It is to be understood that the present invention is not limited to the embodiments described above and illustrated herein, but encompasses any and all variations falling within the scope of the appended claims. For example, while four screen sweepers are shown in the figures, as few as one sweeper can be used to keep screen 52 clean, depending on the amount of debris in the water passing through screen 52. Further, wedge shaped holes 138 could instead have other non-wedge shapes.

What is claimed is:

1. A self-cleaning intake screen assembly for preventing debris, fish, and other wildlife from being transferred from a waterway, comprising:

a conical support structure having a circular base, a cap plate, and a plurality of support studs extending therebetween;

a screen extending between the base and the cap plate and affixed to the support studs; and a screen sweeping assembly rotatably mounted to the cap plate for sweeping debris off of the screen;

wherein the screen sweeping assembly includes:
a motor attached to the cap plate, and
a plurality of elongate screen sweepers attached to the motor.

2. The self-cleaning intake screen assembly as recited in claim 1, wherein each of the plurality of elongate screen sweepers is angled rearwardly from a forward direction of travel.

3. A self-cleaning intake screen assembly for preventing debris, fish, and other wildlife from being transferred from a waterway, comprising:

a conical support structure having a circular base, a cap plate, and a plurality of support studs extending therebetween;

a screen extending between the base and the cap plate and affixed to the support studs;

a screen sweeping assembly rotatable mounted to the cap plate for sweeping debris off of the screen, the screen sweeping assembly including a motor attached to the cap plate and a plurality of elongate screen sweepers attached to the motor; and a brush cleaner extending between the circular base and the cap plate, and protruding above the screen for periodic engagement with the screen sweepers.

4. A self-cleaning intake screen assembly for preventing debris, fish, and other wildlife from being transferred from a waterway, comprising:

a conical support structure having a circular base, a cap plate, and a plurality of support studs extending therebetween;

a screen extending between the base and the cap plate and affixed to the support studs;

a screen sweeping assembly rotatably mounted to the cap plate for sweeping debris off of the screen; and a flow restrictor disposed inside the conical support structure for restricting water flow through a portion of the screen in order to reduce differences in water flow rates through different portions of the screen.

5. The self-cleaning intake screen assembly as recited in claim 1, wherein the flow restrictor is a disk shaped member disposed between the cap plate and the circular base.

6. The self-cleaning intake screen assembly as recited in claim 5, wherein the disk shaped member is adjustably supported between the cap plate and the circular base so that a distance between the disk shaped member and the circular base is selectively adjustable.

7. The self-cleaning intake screen assembly as recited in claim 4, wherein the flow restrictor is a conical shaped member having an apex end terminating in a first hole that faces the circular base and a base end terminating in a second hole that faces the cap plate.

8. The self-cleaning intake screen assembly as recited in claim 7, wherein the conical shaped member is adjustably supported between the cap plate and the circular base so that a distance between the conical member and the circular base is selectively adjustable.

9. The self-cleaning intake screen assembly as recited in claim 4, wherein the flow restrictor is a pair of overlapping first and second cone members, the first cone member having a first plurality of holes formed therein and the second cone member having a second plurality of holes formed therein, the first cone being rotatable relative to the second cone member to adjust an amount of overlap between the first and second pluralities of holes.

* * * * *